United States Patent
Bassani

(10) Patent No.: US 8,960,414 B2
(45) Date of Patent: Feb. 24, 2015

(54) RETAINING DEVICE FOR A VIBRATION TRAY

(71) Applicant: Countlab Inc., Quebec (CA)

(72) Inventor: Loris Bassani, Montreal (CA)

(73) Assignee: Countlab Inc., Quebec (CA)

( * ) Notice: Subject to any disclaimer, the term of this patent is extended or adjusted under 35 U.S.C. 154(b) by 64 days.

(21) Appl. No.: 13/750,250

(22) Filed: Jan. 25, 2013

(65) Prior Publication Data

US 2014/0116852 A1    May 1, 2014

(30) Foreign Application Priority Data

Oct. 26, 2012   (CA) ..................................... 2793336

(51) Int. Cl.
  *B65G 27/00*   (2006.01)
  *B65G 27/08*   (2006.01)

(52) U.S. Cl.
  CPC ....................................... *B65G 27/08* (2013.01)
  USPC .......................... 198/771; 198/758; 198/752.1

(58) Field of Classification Search
  CPC . B65G 27/08; B65G 27/26; B65G 2812/0372
  USPC ....................................... 198/752.1, 758, 771
  See application file for complete search history.

(56) References Cited

U.S. PATENT DOCUMENTS

| 3,744,631 | A | | 7/1973 | Smith et al. |
| 4,040,951 | A | | 8/1977 | Cole |
| 4,687,093 | A | * | 8/1987 | Marshall et al. ........... 198/465.2 |
| 5,277,300 | A | | 1/1994 | Maggioni |
| 5,704,466 | A | | 1/1998 | Mosher |
| 6,536,750 | B1 | * | 3/2003 | Martin ....................... 198/752.1 |
| 6,631,799 | B2 | | 10/2003 | Samson |
| 7,175,027 | B2 | | 2/2007 | Strong et al. |
| 7,439,454 | B2 | * | 10/2008 | Komatsu et al. .............. 198/763 |

* cited by examiner

*Primary Examiner* — James R Bidwell
(74) *Attorney, Agent, or Firm* — Greenblum & Bernstein, P.L.C.

(57) ABSTRACT

A vibratory apparatus for feeding discrete articles. The vibratory apparatus has a tray for receiving the discrete articles and a vibratory drive for imparting a vibration movement to the tray. A retaining device releasably retains the tray to the vibratory drive. The retaining device includes a tray locking assembly selectively moveable between a locked position to lock the tray to the vibratory drive and an unlocked position to unlock the tray from the vibratory drive. In the unlocked position the tray can be removed from the vibratory drive. In the locked position the tray is locked to the vibratory drive in a vibration transmission relationship.

34 Claims, 10 Drawing Sheets

RETAINING DEVICE FOR A VIBRATION TRAY

FIELD OF THE INVENTION

The present invention relates to vibratory feeding systems. More specifically, the invention relates to a device for securing a vibration tray to a vibration drive of a vibratory feeding system.

BACKGROUND OF THE INVENTION

Vibratory feeding systems are used to perform different operations on discrete articles in a production or packaging line. Such operations include filtering, sorting, singulation and transportation, amongst others.

An important factor in designing a vibratory feeding system is the manner in which the vibration tray is mounted to the vibration drive of the vibratory feeding system. The vibration drive and the vibration tray should not experience relative motion between each other during operation and the connection should efficiently transmit vibrations to the tray. Loose connections between the vibration drive and the vibration tray can result in several problems. For example, components may rattle against each other, resulting in a loss of vibration potential and possible damage to the components of the vibratory feeding system.

Another requirement of vibratory feeding systems is to allow quick removal and installation of the tray. This is useful in applications where the tray needs cleaning between different production runs to avoid cross-contamination or use of a different tray.

Thus, there is a need in the industry for a device for securing a vibration tray to a vibration drive which permits the tray to be quickly and easily removed and re-installed on the vibration drive and at the same time allows an effective transmission of vibratory motion from the vibratory drive to the tray.

SUMMARY OF THE INVENTION

As embodied and broadly described herein the invention provides a vibratory apparatus for feeding discrete articles. The vibratory apparatus has a tray for receiving the discrete articles and a vibratory drive for imparting a vibration movement to the tray. A retaining device releasably retains the tray to the vibratory drive. The retaining device includes a tray locking assembly selectively moveable between a locked position to lock the tray to the vibratory drive and an unlocked position to unlock the tray from the vibratory drive. In the unlocked position the tray can be removed from the vibratory drive. In the locked position the tray is locked to the vibratory drive in a vibration transmission relationship.

As embodied and broadly described herein the invention provides a retaining device for releasably retaining a tray to a vibratory drive. The retaining device includes a tray locking assembly selectively moveable between a locked position to lock the tray to the vibratory drive and an unlocked position to unlock the tray from the vibratory drive. In the unlocked position the tray can be removed from the vibratory drive. In the locked position the tray is locked to the vibratory drive in a vibration transmission relationship.

BRIEF DESCRIPTION OF THE DRAWINGS

A detailed description of embodiments of the present invention is provided hereinbelow with reference to the following drawings, in which.

Figure 1A:
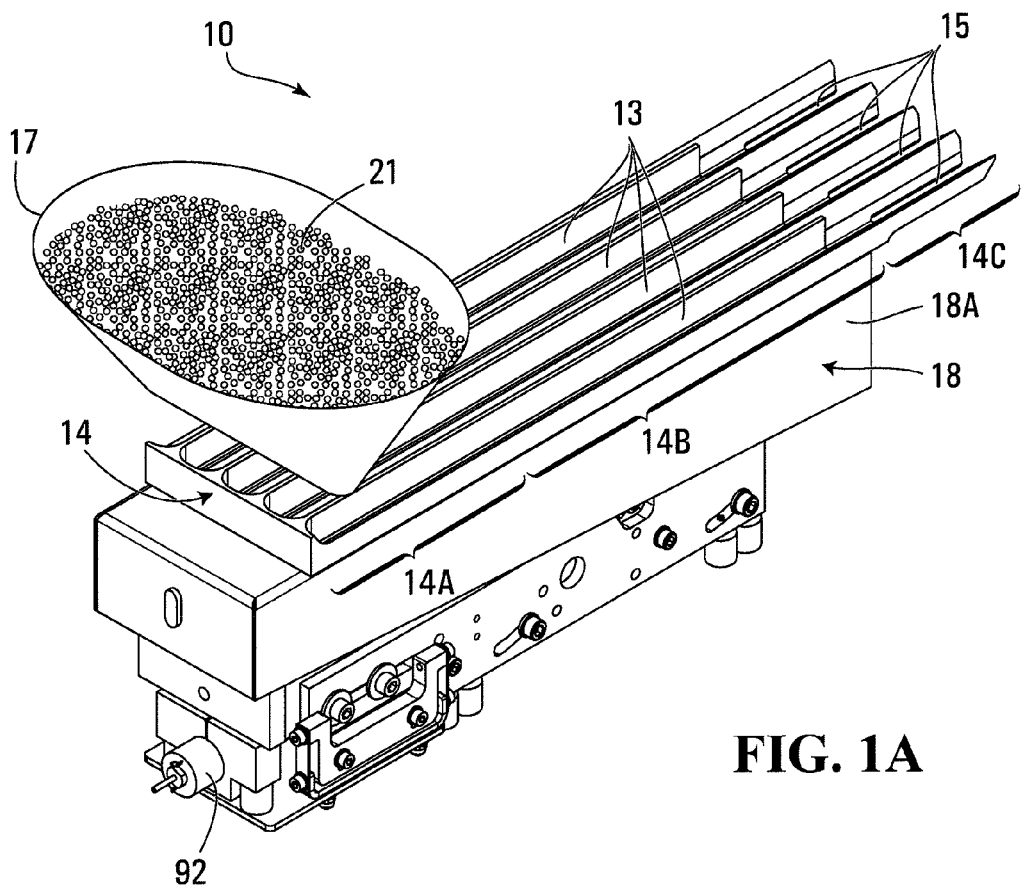
FIG. 1A is a perspective view of a vibratory feeding system in accordance with an embodiment of the present invention.
Figure 1B:
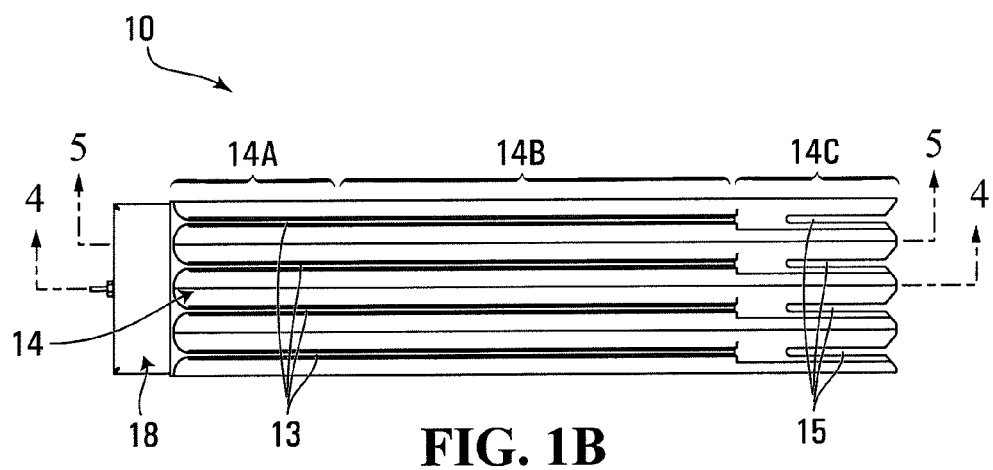
FIG. 1B is a top view of the vibratory feeding system of FIG. 1A.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION OF THE EMBODIMENTS OF THE INVENTION

To facilitate the description, any reference numeral designating an element in one figure will designate the same element if used in any other figures. In describing the embodiments, specific terminology is resorted to for the sake of clarity but the invention is not intended to be limited to the specific terms so selected, and it is understood that each specific term encompasses all equivalents.

The vibratory feeding system 10 includes a vibratory drive 11, which transmits vibrating motion to a vibration tray 14 through a retaining device. While not shown in the drawings, it is understood that the vibratory feeding system 10 is provided with a vibratory drive control to regulate the vibration characteristics the vibratory drive 11 such as amplitude, frequency, etc.

The vibration tray 14 conveys discrete articles 21 (such as pills, pellets, fine grained ingredients, candies, nuts, etc.) which are initially contained in bulk in a hopper 17. The vibration tray 14 receives the discrete articles 21 from the hopper 17 at a discrete article reception zone 14A. As the vibration tray 14 vibrates, the discrete articles 21 will move along a discrete article transportation zone 14B until they reach a discrete article discharge zone 14C. At the discharge zone 14C, the discrete articles 21 are released from the vibration tray 14 for further processing such as, sorting, filtering, packaging, etc. In a specific example of implementation, the discharge zone 14C is located above a conveyor belt (not shown) transporting empty containers to be filled with the discrete articles 21. The vibratory motion imparted to the vibration tray 14 causes the discrete articles 21 to move along the tray 14 and fall in respective empty containers. Once the containers are filled they are transported away from the vibration tray 14 and a new batch of empty containers are lined-up with the vibration tray 14 for filling. The cycle constantly repeats.

The shape of the vibration tray 14 can be uniform throughout its length or can vary depending on the application. For example, the vibration tray 14 shown in FIG. 1A has multiple substantially "U-shaped" grooves along its reception and transportation zones 14A, 14B with walls 13 separating the respective grooves. The U-shaped grooves define individual pathways for the discrete articles 21 to travel along the vibration tray surface. The U-shaped grooves terminate with elongated slots 15 that allow the discrete articles 21 to be discharged from the vibration tray 14.

The underside 14D of the vibration tray 14 has recesses defining respective sockets 14E, which releasably receive vibratory abutment pins 30. The sockets 14E are configured such that the vibratory abutment pins 30 can be quickly inserted therein when the vibration tray 14 is installed, allowing locking the vibration tray 14 in place. Several different socket geometries are possible, some of which are depicted in FIGS. 2A through 2D. The vibratory abutment pins 30 have respective pin bodies 32 and enlarged pinheads 34. The embodiment shown employs four pins 30 positioned in a rectangular arrangement, however a different number of pins 30 may be used.

Figure 2A:
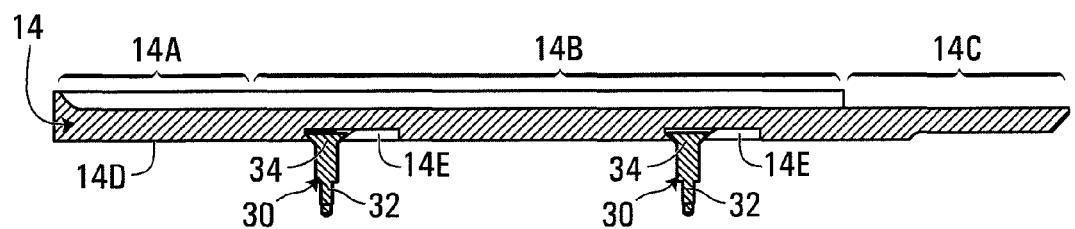
FIG. 2A is a longitudinal cross-sectional view showing the mechanical connection between a vibration tray and vibratory abutment pins in accordance with an embodiment of the present invention.
Figure 2B:
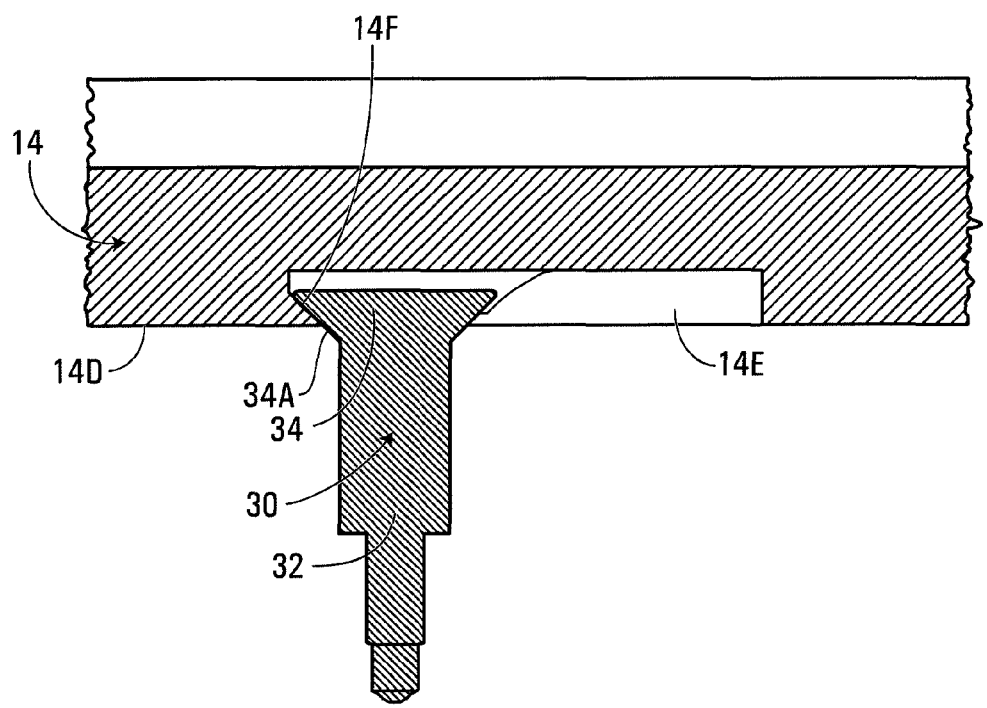
FIG. 2B is an enlarged cross-sectional view showing the vibration tray and the vibratory abutment pins of FIG. 2A in greater detail.
Figure 2C:
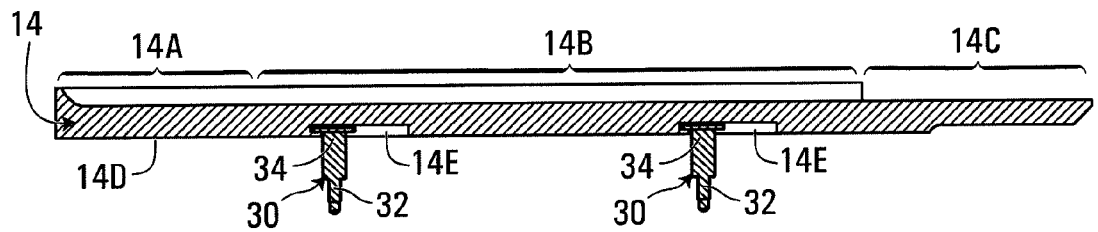
FIG. 2C is a view similar to FIG. 2A according to a variant.
Figure 2D:
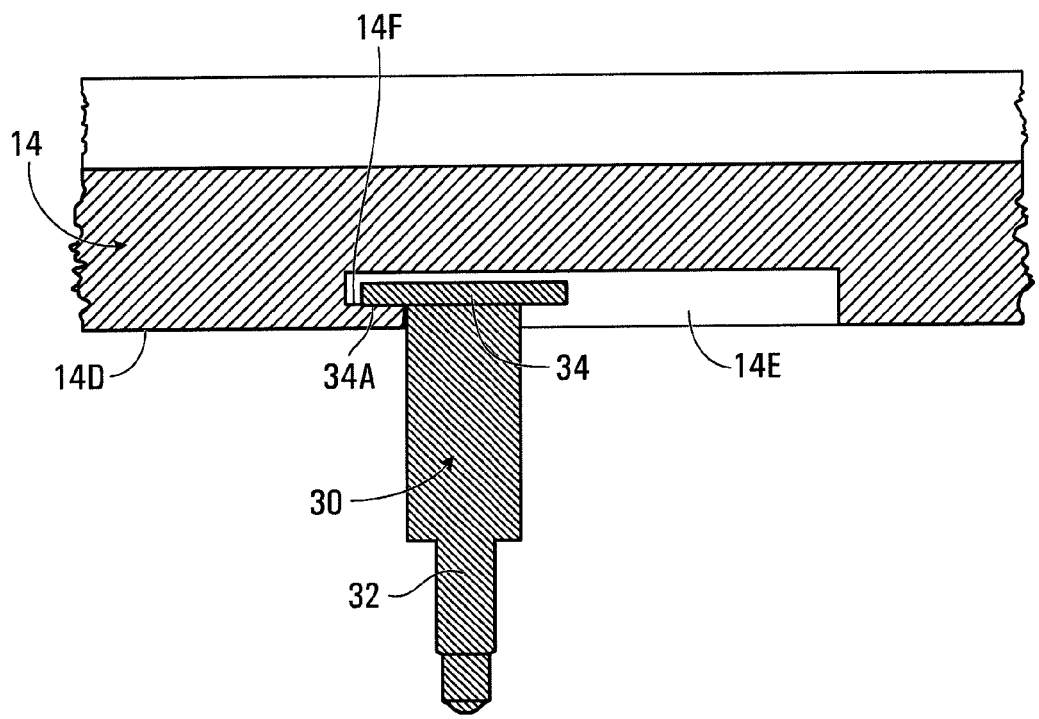
FIG. 2D is an enlarged cross-sectional view showing the vibration tray and the vibratory abutment pins of the variant shown in FIG. 2C.

In the embodiment of FIGS. 2A and 2B, the pinheads 34 have a beveled surface 34A which abuts against an inclined abutment surface 14F of the respective sockets 14E. In the embodiment of FIGS. 2C and 2D, the pinheads 34 are flat heads with a horizontal surface 34A which abuts against an abutment surface 14F that is also horizontal. In another embodiment, the pinheads 34 may be constructed with at least one protrusion (or indentation) which cooperates with a corresponding indentation (or protrusion) in the socket 14E to facilitate properly locating the vibratory abutment pin 30.

Figure 5A:
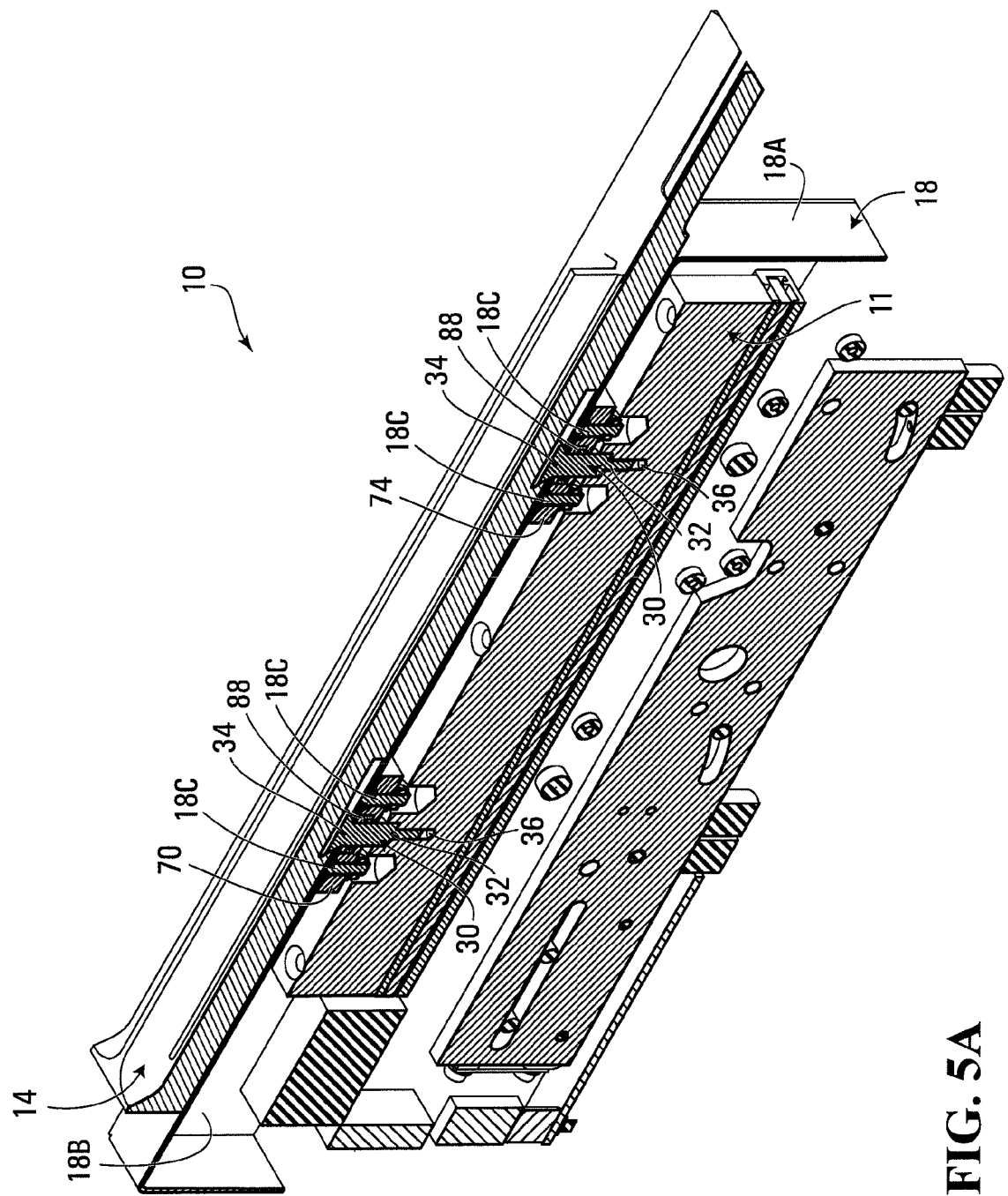
FIG. 5A is a perspective cross-sectional view of the vibratory feeding system of FIG. 1B taken along line 5-5 of FIG. 1B.
Figure 5B:
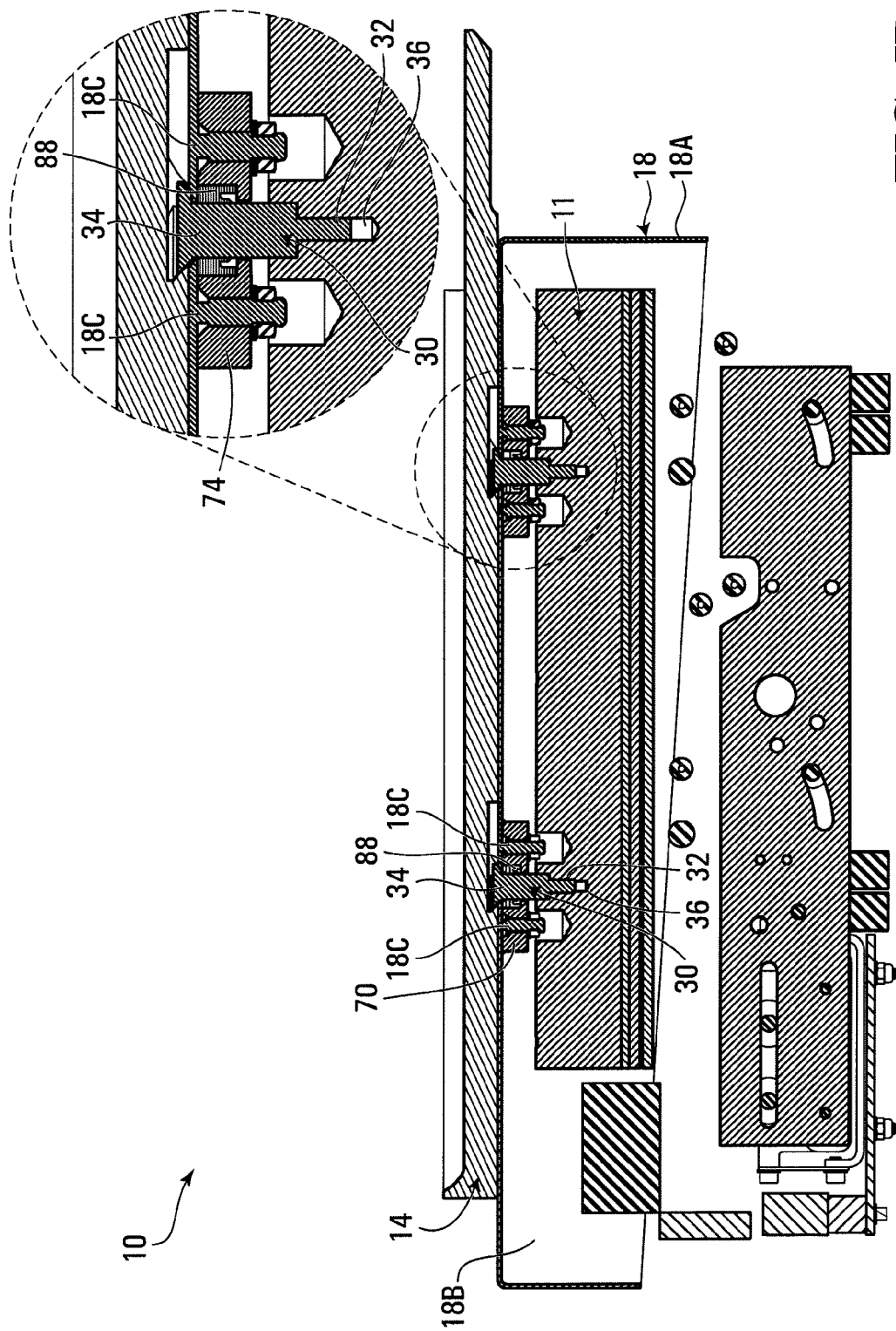
FIG. 5B is a cross-sectional view in elevation of the vibratory feeding system of FIG. 1B, the cross-section taken along line 5-5 of FIG. 1B.
Figure 6:
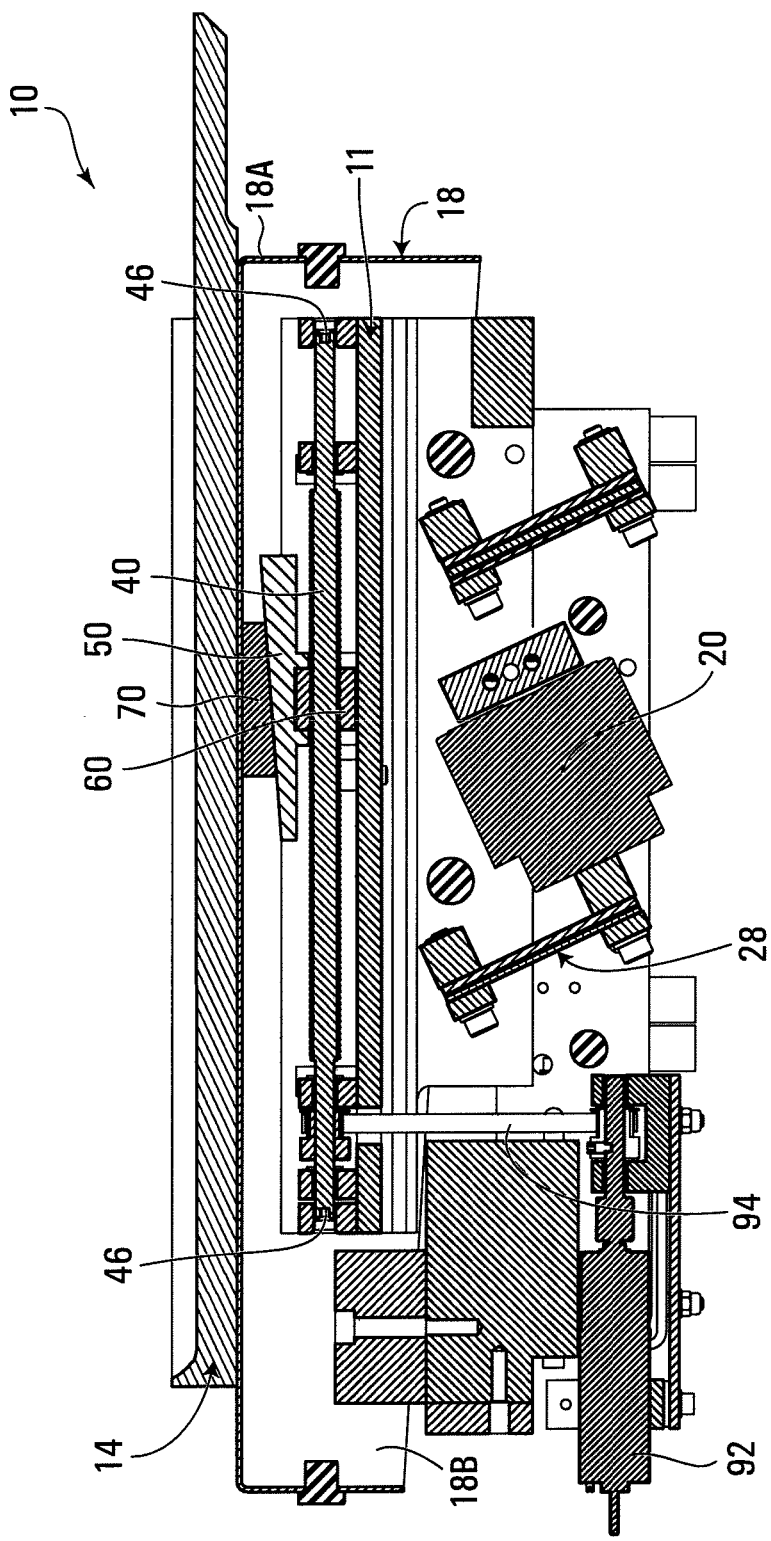
FIG. 6 shows a cross-sectional view of the vibratory feeding system in accordance with the present invention.

The vibration tray 14 sits on top of a cover 18 having an outer surface 18A, an inner surface 18B, inwardly extending fasteners 18C (best seen in FIGS. 5A and 5B) and apertures 18D for receiving the vibratory abutment pins 30. The cover 18 overlays the internal moving components of the vibratory drive 11 which enable the generation and transmission of vibrations to the vibration tray 14.

Figure 4A:
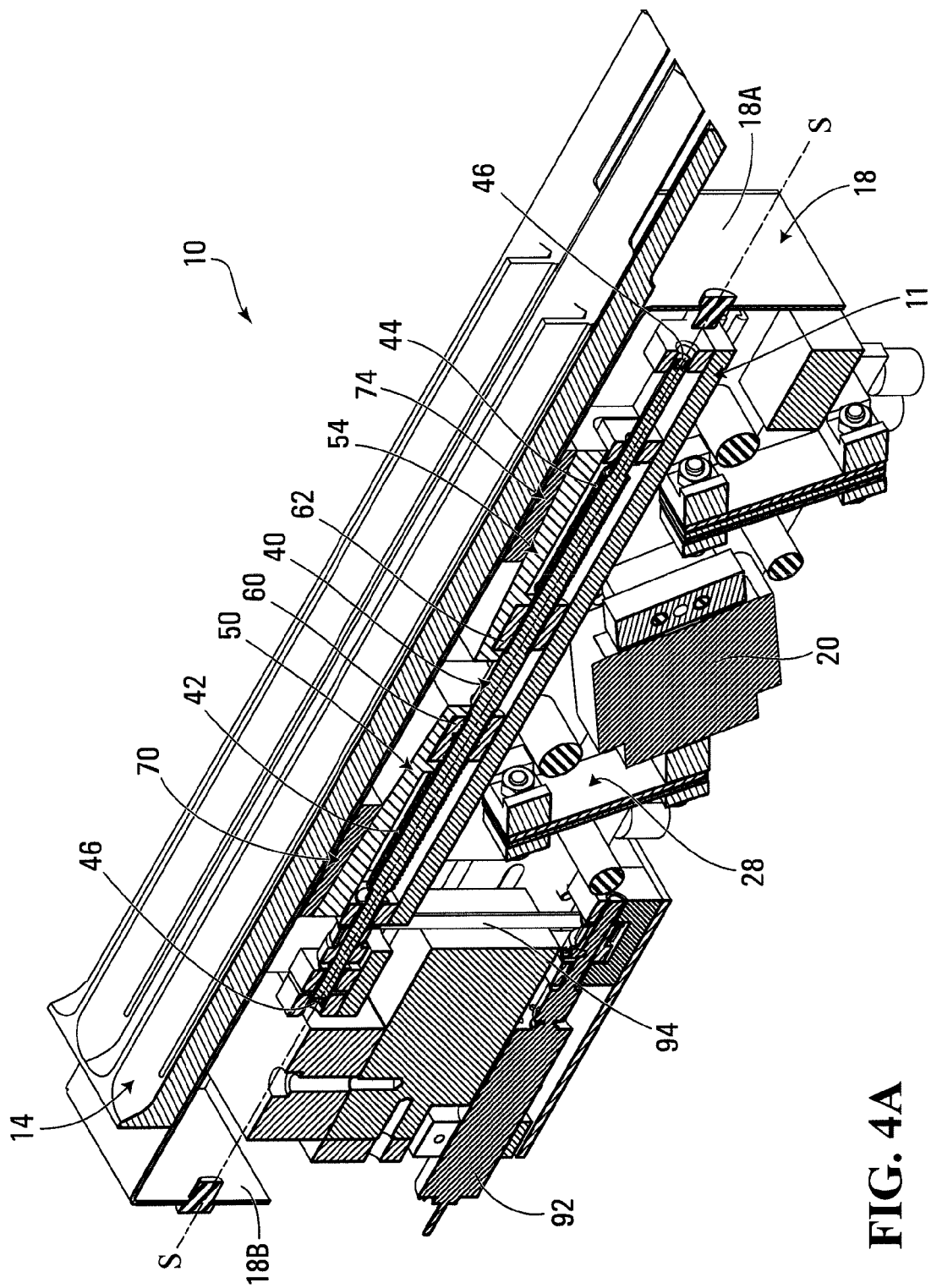
FIG. 4A is a perspective cross-sectional view of the vibratory feeding system of FIG. 1B taken along line 4-4 of FIG. 1B.
Figure 4B:
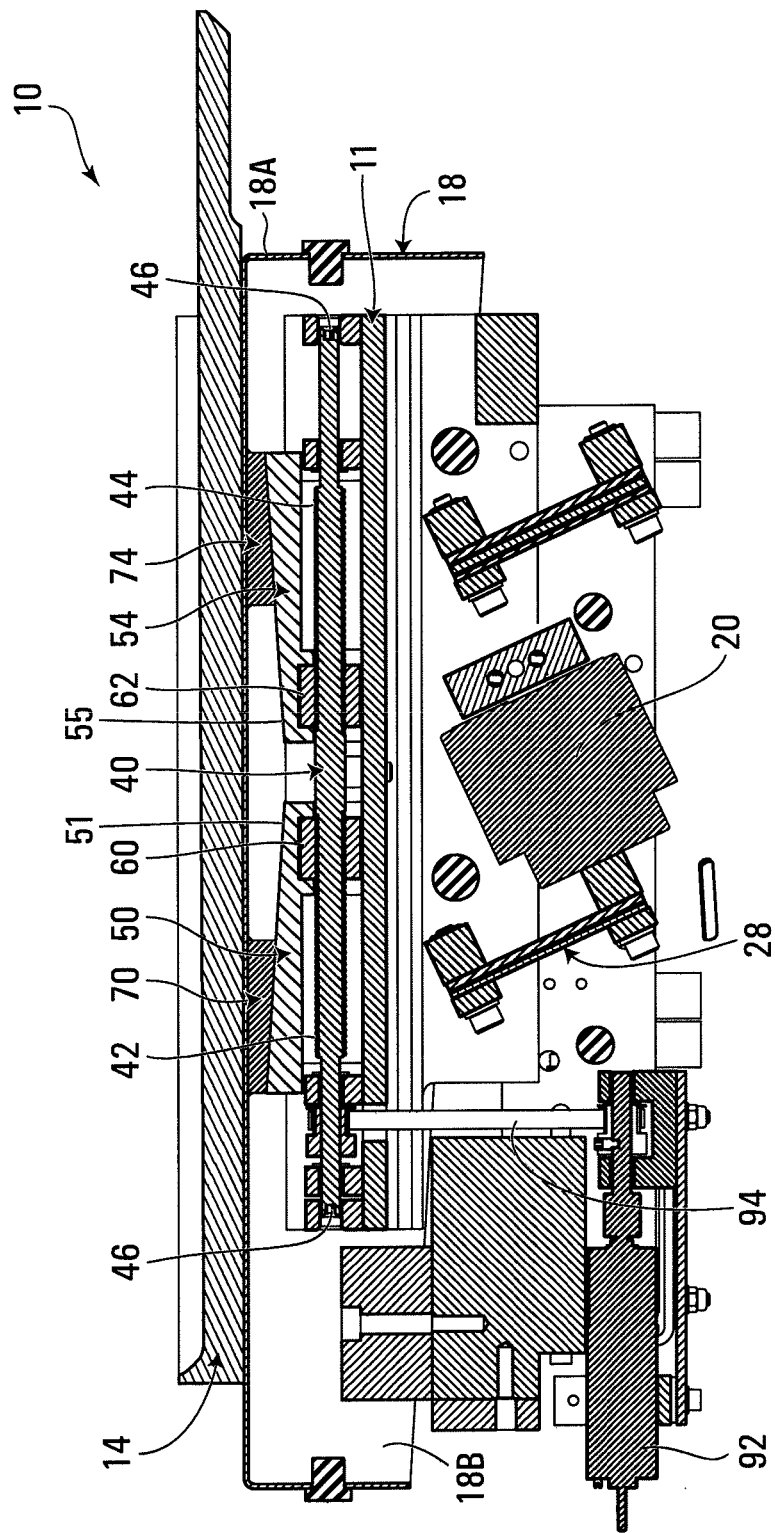
FIG. 4B is a cross-sectional view in elevation of the vibratory feeding system of FIG. 1B taken along line 4-4 of FIG. 1B.

As best seen in FIGS. 4A and 4B, the vibratory drive 11 is connected to a vibration source 20 via a rocker arm 28. The rocker arm 28 is connected to the vibratory drive body and transmits vibrations that are imparted to the rocker arm 28 by the vibration source 20.

The vibration source 20 can be any mechanism that generates vibratory movement. It can be mechanical or electromechanical. Vibration sources are generally known in the art and do not require a detailed description. In operation, the vibration source 20 induces vibrations onto the rocker arm 28 that transmits those vibrations to the vibratory drive 11.

The vibratory abutment pins 30 connect the vibratory drive 11 to the vibration tray 14. Each pin 30 is held in a corresponding recess 36 (see FIG. 3) in the vibratory drive 11 while the pinheads 34 protrude outwardly therefrom. As such, the vibration tray 14 can be mounted on the pinheads 34. The connection between each of the pin bodies 32 and corresponding recesses 36 is secure enough to ensure that the pins 30 are not dislodged from the vibratory drive 11 during operation of the vibratory feeding system 10. In the embodiment shown, the connection is a threaded connection.

The retaining device, which releasably connects the vibration tray 14 to the vibratory drive 11, includes a tray locking assembly that can lock the tray 14 to the pinheads 34 or unlock the tray 14 from the pinheads 34. In the locked position the tray 14 is subjected to vibration movement to transport discrete articles 21 on its surface. When the tray 14 is unlocked it can be removed from the vibratory drive 11 for cleaning, servicing or replacement.

The tray locking assembly includes a linear actuator, such as a rotationally driven jackscrew 40, two lower cam plates 50, 54 and two upper cam plates 70, 74. Jackscrew 40 extends along a longitudinal axis S-S (FIG. 4A) and includes two threaded portions 42, 44 of opposite hand. The jackscrew 40 also has tool-receiving sockets 46 at its ends (the purpose of which will be described below). Drive blocks 60, 62 threadedly engage the jackscrew 40. The blocks 60, 62 are received in respective channels of the lower cam plates 50 and 54 and drive the plates 50, 54 in opposite directions when the jackscrew 40 rotates.

Lower cam plates 50, 54 are of inverted U-shape (see FIG. 3) and straddle the jackscrew 40. The lower cam plates 50, 54 have inclined surfaces 51, 55 that are in sliding engagement with corresponding inclined surfaces 69, 73 on upper cam plates 70, 74.

Upper cam plates 70, 74 are mounted to the underside of the cover 18 and they slidingly engage the lower cam plates 50, 54. The upper cam plates 70, 74 are mounted to the cover 18 by fasteners 18C that project from the underside of the cover.

The upper cam plates 70, 74 have apertures 86 to slidingly receive the pins 30. Seals 88 are provided to prevent ingress of contaminants through the apertures 86.

Figure 4C:
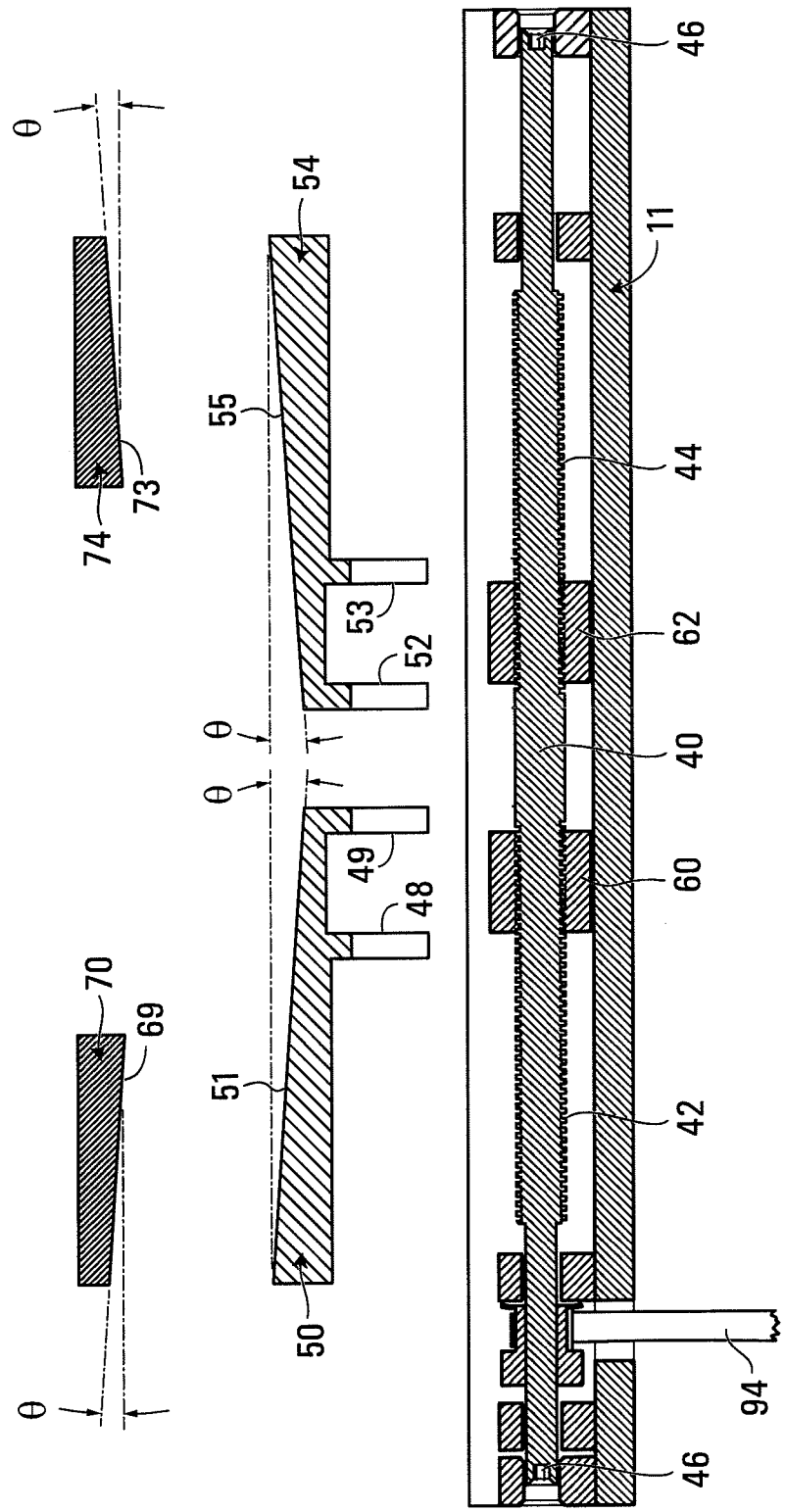
FIG. 4C is a cross-sectional view showing some of the elements of the vibratory feeding system of FIGS. 1A and 1B.

With reference to FIG. 4C (which shows the lower cam plates 50, 54 and the upper cam plates 70, 74 in exploded relationship), an angle of inclination θ of the inclined surfaces 51, 55, 69, 73 (relative to the horizontal) is shown. It can be understood that the higher the angle of inclination θ, the larger the vertical movement of the upper cam plates 70, 74 will be for a given displacement of the lower cam plates 50, 54.

The drive block 60 is received in a channel defined between abutment surfaces 48, 49 on lower cam plate 50 while drive block 62 is housed in the channel defined between abutment surfaces 52, 53 on lower cam plate 54. Thus, rotation of the jackscrew 40 in either of a clockwise or counterclockwise direction will cause the drive blocks 60, 62 to push against abutment surfaces 48 and 53 or abutment surfaces 49 and 52, thereby causing lower cam plates 50 and 54 to move in opposite directions along the longitudinal axis S-S of the jackscrew 40.

Movement of the lower cam plates 50, 54 along the longitudinal axis S-S of the jackscrew 40 is converted into vertical movement of the upper cam plates 70, 74 due to the sliding engagement between inclined surfaces 51, 69 and between inclined surfaces 55, 73 respectively. For instance, when the lower cam plates 50, 54 move away from each other, the upper cam plates 70, 74 will move down. When the lower cam plates 50, 54 move towards each other, the upper cam plates 70, 74 move up. Such an arrangement allows a user to progressively tighten or loosen the connection between the vibratory drive 11 and the vibration tray 14. In addition, the cover 18 maintains the vibration tray 14 at a horizontal level as it is being pushed upwardly. Thus, the pinheads 34 will engage the abutment surfaces 14F of the vibration tray 14 simultaneously.

The process for removing the tray 14 and re-installing it back on the cover 18 is generally as follows. Note that such removal operation may be required when the tray 14 has to be cleaned between production runs. When edible or pharmaceutical compositions are being processed, cross-contamination is a risk and it is necessary to thoroughly clean the equipment. Another reason to remove the tray 14 is to replace it with one of different configuration that is better suited to the discrete articles 21 of a new production run.

The tray removal operation is performed by first loosening the tray 14. The jackscrew 40 is rotated to cause the lower cam plates 50, 54 to move away from each other, thus lowering the upper cam plates 70, 74. Since the cover 18 is attached to the upper cam plates 70, 74 it moves down with the upper cam plates 70, 74. During the descending movement, the cover 18 and the upper cam plates 70, 74 slide over the pins 30 that are fixed and do not move.

When the cover 18 and the upper cam plates 70, 74 are fully lowered, the tray 14 remains loosely supported on the pinheads 34. The tray 14 is removed from the pinheads 34 by sliding the tray 14 while it rests on the pinheads 34 until they clear the sockets 14E. The tray 14 is then lifted from the machine.

To re-install the tray 14, the same operation is performed but in reverse. The tray 14 is first engaged with the pinheads 34. This is done by inserting the pinheads 34 into the respective sockets 14E and then sliding the tray 14 on the pinheads 34 such as to engage the pinheads 34 with the abutment surfaces 14F. In this fashion, the tray 14 cannot be lifted off the pinheads 34. The tray locking is actuated by turning the jackscrew 40 to raise the upper cam plates 70, 74 along with the cover 18 such that the cover 18 presses against the undersurface of the tray 14 and locks the pinheads 34 against the abutment surfaces 14F.

A variety of materials and surface finishing techniques can be chosen for lower cam plates 50, 54 and upper cam plates 70, 74 to accomplish the above described functions. For example, lower cam plates 50, 54 can be made of synthetic material such as polyoxymethylene that is commercialized under the trade name Delrin®. The upper cam plates 70, 74 can be made of stainless steel.

Figure 3:
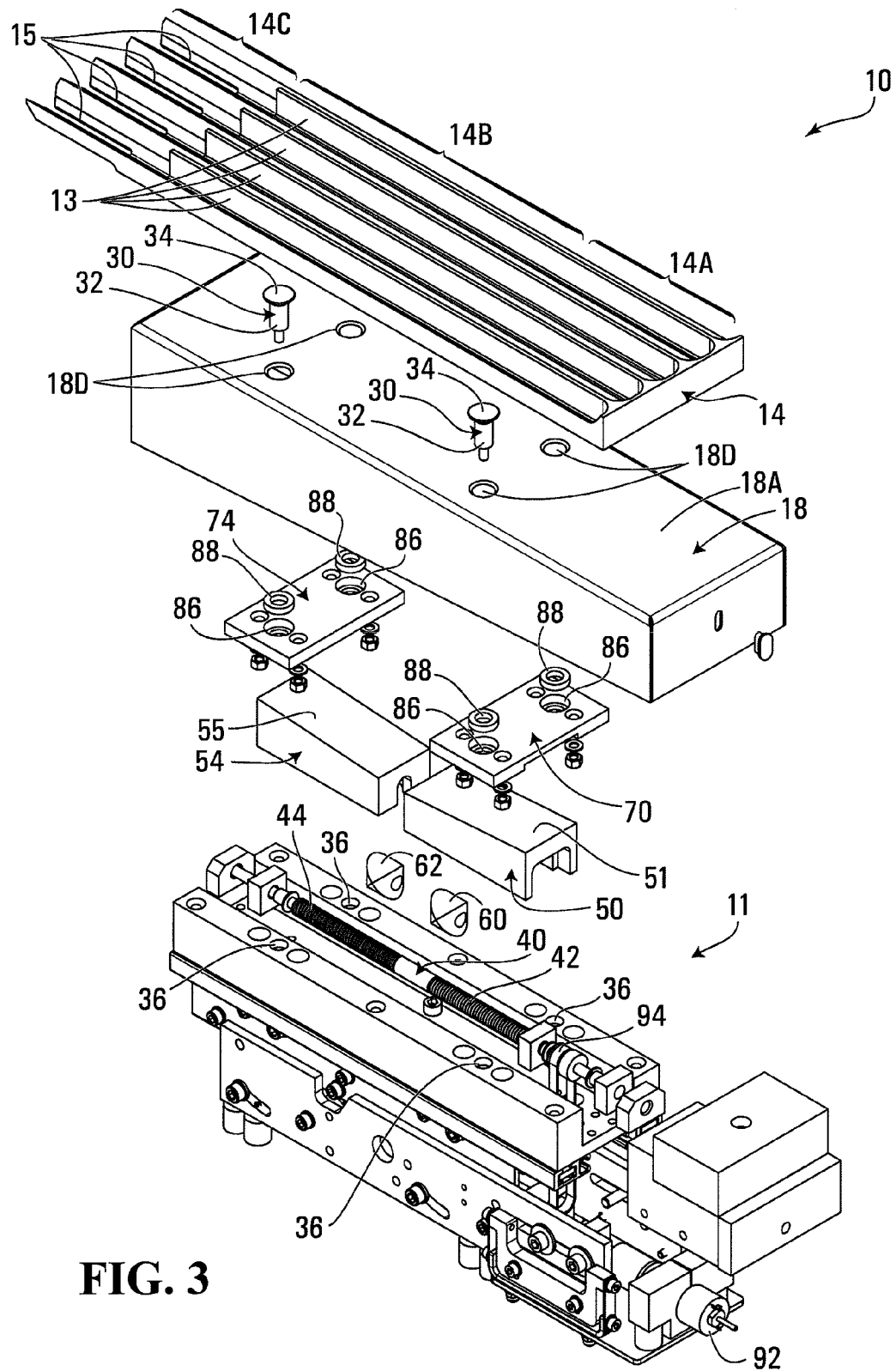
FIG. 3 is an exploded perspective view of the vibratory feeding system of FIG. 1A.

With reference to FIG. 3 the jackscrew 40 is driven by an electric motor 92 via a belt 94. An electric drive motor is preferred over a pneumatic drive since the latter requires a compressed air supply, which otherwise may not be necessary to operate the machine. However, for applications where a compressed air supply is readily available, an equivalent air motor could replace the electric motor 92 without departing from the scope of the invention.

For certain applications, the jackscrew 40 can be manually rotated by using an appropriate tool to engage the sockets 46.

Yet another possible variant is to use a linear actuator other than the jackscrew 40. A linear actuator, such as a piston/cylinder assembly that operates hydraulically or pneumatically is an option. Such linear actuator can be designed to operate horizontally but vertically as well.

Other possibilities also exist, such as using an inflatable bladder located under the cover 18 which raises the cover 18 to lock the tray 14 when the bladder is inflated.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A vibratory apparatus for feeding discrete articles, comprising:
   i. a tray for receiving the discrete articles;
   ii. a vibratory drive;
   iii. a retaining device for releasably retaining the tray to the vibratory drive, the retaining device including:
      a) a tray locking assembly selectively moveable between a locked position to lock the tray to the vibratory drive and an unlocked position to unlock the tray from the vibratory drive;
      b) in the unlocked position the tray being removable from the vibratory drive;
      c) in the locked position the tray being locked to the vibratory drive in a vibration transmission relationship, allowing vibration movement to be imparted to the tray;
   iv. an abutment member releasably engageable with the tray, the abutment member being mounted to the vibratory drive, when the tray locking assembly is in the locked position the tray abutting against the abutment member, the abutment member including a plurality of abutment pins releasably engageable with the tray; and
   wherein the tray has a plurality of sockets for releasably engaging respective ones of the abutment pins,
   wherein the tray is moveable relative to the abutment pins between a released position and an engaged position, in the released position the sockets are releasable from the respective abutment pins to allow removal of the tray from the vibratory drive,
   wherein when the tray is in the engaged position the tray cannot be separated from the abutment pins,
   wherein the tray has an upper surface for receiving the discrete articles and a lower surface, opposite the upper surface, and
   wherein each abutment pin has a pin body and an enlarged head, the enlarged head being releasably engageable in a respective socket.

2. A retaining device as defined in claim 1, wherein each of the abutment pins are simultaneously engageable with the tray.

3. A vibratory apparatus as defined in claim 1, wherein the sockets are formed on the lower surface of the tray.

4. A vibratory apparatus as defined in claim 1, wherein the tray locking assembly moves generally vertically between the locked position and the unlocked position.

5. A vibratory apparatus for feeding discrete articles, comprising:
   i. a tray for receiving the discrete articles;
   ii. a vibratory drive;
   iii. a retaining device for releasably retaining the tray to the vibratory drive, the retaining device including:
      a) a tray locking assembly selectively moveable between a locked position to lock the tray to the vibratory drive and an unlocked position to unlock the tray from the vibratory drive, the tray locking assembly including a linear actuator;
      b) in the unlocked position the tray being removable from the vibratory drive;
      c) in the locked position the tray being locked to the vibratory drive in a vibration transmission relationship, allowing vibration movement to be imparted to the tray;
   iv. an abutment member releasably engageable with the tray, the abutment member being mounted to the vibratory drive, when the tray locking assembly is in the locked position the tray abutting against the abutment member; and wherein the tray locking assembly moves generally vertically between the locked position and the unlocked position, and wherein the linear actuator is in driving relationship with a cam member to impart generally vertical movement to the cam member.

6. A vibratory apparatus as defined in claim 5, wherein the linear actuator includes a jackscrew.

7. A vibratory apparatus as defined in claim 6, wherein the jackscrew causes displacement of the cam member along a longitudinal axis of the jackscrew.

8. A vibratory apparatus as defined in claim 7, wherein the cam member is a first cam member, the tray holding assembly includes a second cam member in sliding contact with the first cam member.

9. A vibratory apparatus as defined in claim 8, wherein the first and second cam members have inter-engaging cam surfaces producing vertical displacement in response to relative sliding motion.

10. A retaining device for releasably retaining a tray to a vibratory drive, said retaining device including:
  i. a tray locking assembly selectively moveable between a locked position to lock the tray to the vibratory drive and an unlocked position to unlock the tray from the vibratory drive;
  ii. in the unlocked position the tray being removable from the vibratory drive;
  iii. in the locked position the tray being locked to the vibratory drive in a vibration transmission relationship, allowing vibration movement to be imparted to the tray;
  iv. an abutment member releasably engageable with the tray, the abutment member being mounted to the vibratory drive, when the tray locking assembly is in the locked position the tray abutting against the abutment member, the abutment member including a plurality of abutment pins releasably engageable with the tray; and
  wherein the tray has a plurality of sockets for releasably engaging respective ones of the abutment pins,
  wherein the tray is moveable relative to the abutment pins between a released position and an engaged position, in the released position the sockets are releasable from the respective abutment pins to allow removal of the tray from the vibratory drive,
  wherein when the tray is in the engaged position the tray cannot be separated from the abutment pins,
  wherein the tray has an upper surface for receiving discrete articles and a lower surface, opposite the upper surface, and
  wherein each abutment pin has a pin body and an enlarged head the enlarged head being releasably engageable in the respective socket.

11. A retaining device as defined in claim 10, wherein each of the abutment pins are simultaneously engageable with the tray.

12. A retaining device as defined in claim 10, wherein the sockets are formed on the lower surface of the tray.

13. A retaining device for releasably retaining a tray to a vibratory drive, said retaining device including:
  i. a tray locking assembly selectively moveable between a locked position to lock the tray to the vibratory drive and an unlocked position to unlock the tray from the vibratory drive, the tray locking assembly including a linear actuator;
  ii. in the unlocked position the tray being removable from the vibratory drive; and
  iii. in the locked position the tray being locked to the vibrator drive in a vibration transmission relationship, allowing vibration movement to be imparted to the tray,
  wherein the tray locking assembly moves generally vertically between the locked position and the unlocked position, and
  wherein the linear actuator is in driving relationship with a cam member to impart vertical motion to the cam member.

14. A retaining device as defined in claim 13, wherein the linear actuator includes a jackscrew.

15. A retaining device as defined in claim 14, wherein the jackscrew causes displacement of the cam member along a longitudinal axis of the jackscrew.

16. A retaining device as defined in claim 15, wherein the cam member is a first cam member, the tray locking assembly includes a second cam member in sliding contact with the first cam member.

17. A retaining device as defined in claim 16, wherein the first and second cam members have inter-engaging cam surfaces producing vertical displacement in response to relative sliding motion.

18. A vibratory apparatus for feeding discrete articles, comprising:
  (a) a tray for receiving the discrete articles;
  (b) a vibratory drive;
  (c) a retaining device for releasably retaining the tray to the vibratory drive, the retaining device including:
    (i) a tray locking assembly selectively operable to acquire a locked position in which the tray is locked to the vibratory drive and an unlocked position in which the tray is unlocked from the vibratory drive;
    (ii) in the unlocked position the tray being removable from the vibratory drive;
    (iii) in the locked position the tray being locked to the vibratory drive in a vibration transmission relationship, allowing vibration movement to be imparted to the tray;
    (iv) the tray locking assembly including an actuator producing mechanical motion acting to generate a clamping force between the tray and the vibratory drive, when the tray locking assembly is operated to acquire the locked position, the clamping force being progressive and increasing with an increased mechanical motion produced by the actuator.

19. A vibratory apparatus as defined in claim 18, including an abutment member releasably engageable with the tray, the abutment member being mounted to the vibratory drive, when the tray locking assembly is in the locked position the tray abutting against the abutment member.

20. A vibratory apparatus as defined in claim 19, wherein the abutment member includes a plurality of abutment pins releasably engageable with the tray.

21. A retaining apparatus as defined in claim 20, wherein each of the abutment pins are simultaneously engageable with the tray.

22. A vibratory apparatus as defined in claim 20, wherein the tray has a plurality of sockets for releasably engaging respective ones of the abutment pins.

23. A vibratory apparatus as defined in claim 22, wherein the tray is moveable relative to the abutment pins between a released position and an engaged position, in the released position the sockets are releasable from the respective abutment pins to allow removal of the tray from the vibratory drive.

24. A vibratory apparatus as defined in claim 23, wherein when the tray is in the engaged position the tray cannot be separated from the abutment pins.

25. A vibratory apparatus as defined in claim 24, wherein the tray has an upper surface for receiving the discrete articles and a lower surface, opposite the upper surface.

26. A vibratory apparatus as defined in claim 25, wherein the sockets are formed on the lower surface of the tray.

27. A vibratory apparatus as defined in claim 25, wherein each abutment pin has a pin body and an enlarged head, the enlarged head being releasably engageable in a respective socket.

28. A vibratory apparatus as defined in claim 19, wherein the tray locking assembly moves generally vertically between the locked position and the unlocked position.

29. A vibratory apparatus as defined in claim 18, wherein the actuator is a linear actuator.

30. A vibratory apparatus as defined in claim 29, wherein the linear actuator is in driving relationship with a cam member to impart a generally vertical movement to the cam member.

31. A vibratory apparatus as defined in claim 30, wherein the linear actuator includes a jackscrew.

32. A vibratory apparatus as defined in claim 31, wherein the jackscrew causes displacement of the cam member along a longitudinal axis of the jackscrew.

33. A vibratory apparatus as defined in claim 32, wherein the cam member is a first cam member, the tray holding assembly includes a second cam member in sliding contact with the first cam member.

34. A vibratory apparatus as defined in claim 33, wherein the first and second cam members have inter-engaging cam surfaces producing vertical displacement in response to relative sliding motion.

* * * * *